United States Patent [19]

Green

[11] Patent Number: 4,829,427

[45] Date of Patent: May 9, 1989

[54] DATABASE QUERY CODE GENERATION AND OPTIMIZATION BASED ON THE COST OF ALTERNATE ACCESS METHODS

[75] Inventor: Nancy L. Green, Raleigh, N.C.

[73] Assignee: Data General Corporation, Westboro, Mass.

[21] Appl. No.: 614,416

[22] Filed: May 25, 1984

[51] Int. Cl.[4] .............................................. G06F 15/00
[52] U.S. Cl. .................................... 364/300; 364/200
[58] Field of Search ... 364/200 MS File, 900 MS File, 364/300

[56] References Cited

U.S. PATENT DOCUMENTS

| | | | |
|---|---|---|---|
| 3,906,455 | 9/1975 | Houston et al. | 364/200 |
| 3,916,387 | 10/1975 | Woodrum | 364/200 |
| 4,130,867 | 12/1978 | Bachman et al. | 364/200 |
| 4,384,325 | 3/1983 | Slechta, Jr. et al. | 364/200 |
| 4,468,728 | 8/1984 | Wang | 364/200 |
| 4,497,039 | 1/1985 | Kitakami et al. | 364/900 |
| 4,504,907 | 3/1985 | Manning et al. | 364/200 |
| 4,506,326 | 3/1985 | Shaw et al. | 364/300 |
| 4,531,186 | 7/1985 | Knapman | 364/300 |

Primary Examiner—Raulfe B. Zache
Assistant Examiner—Florin Munteanu

[57] ABSTRACT

An optimizer-code generator for use in a data base system. The optimizer-code generator employs a component called a scan analyzer for performing implementation-dependent analysis and providing implementation-dependent query code. The optimizer-code generator receives a query in logical tree form. It first optimizes the logical tree. In so doing, it provides information from the logical tree to the scan analyzer, which specifies what methods are available for accessing information required for the query and what each of the available methods costs. The optimizer-code generator uses the cost information in its optimization of the logical tree and specifies the access methods to be used in the logical tree. The code generator then uses the logical tree to generate query code. In so doing, it provides the specifications of the access methods to the scan analyzer, which returns query code for the access method. The code generator then incorporates the query code for the access method in the query code which it generates from the logical tree.

11 Claims, 15 Drawing Sheets

| P# | PNAME | COLOR | WEIGHT | CITY | S# | P# | QTY | S# | SNAME | STATUS | CITY |
|---|---|---|---|---|---|---|---|---|---|---|---|
| P1 | NUT | RED | 12 | LONDON | S1 | P1 | 300 | S1 | SMITH | 20 | LONDON |

| S# | P# | DRID |
|----|----|------|
| S1 | P1 | l |
| S1 | P2 | m |
| S1 | P3 | n |
| S1 | P4 | o |
| S1 | P6 | p |
| S2 | P1 | q |
| S2 | P2 | r |
| S3 | P2 | s |
| S4 | P2 | t |
| S4 | P3 | u |
| S4 | P4 | v |
| S4 | P5 | w |

S#,P# INDEX FOR SP 405

| P# | DRID |
|----|------|
| P1 | f |
| P2 | g |
| P3 | h |
| P4 | i |
| P5 | j |
| P6 | k |

P# INDEX FOR P 403

| S# | DRID |
|----|------|
| S1 | a |
| S2 | b |
| S3 | c |
| S4 | d |
| S5 | e |

S# INDEX FOR S 401

DATABASE QUERY CODE GENERATION AND OPTIMIZATION BASED ON THE COST OF ALTERNATE ACCESS METHODS

BACKGROUND OF THE INVENTION

1. Field of the Invention

The present invention may relate to digital computer systems and more particularly to data base systems implemented in digital computer systems and to systems and methods for optimizing queries in data base systems.

2. Description of Prior Art

Data base systems are computer-based record keeping systems which allow users to perform operations such as locating, adding, deleting, and updating records stored in a computer system. The operation of locating data in a data base is called a query. Since data bases may contain large numbers of records and a given query may require combination of information from different records, a recurrent problem in the design of data base systems has been making queries more efficient. Most prior-art data base systems have included components termed query optimizers, which take a given query and transform it into an optimized query which is equivalent to the given query, but which may be executed more efficiently than the given query. Either the optimizer or another component called the code generator then transforms the optimized query into query code which is executable by the data base system to produce the records requested in the query.

The design of query optimizers and code generators is complex, and is made more so by the fact that optimization may occur at several levels. First, the query being optimized may be logically transformed into an equivalent but more efficient form. Second, the optimized query may be able to take advantage of information such as indexes which the data base system maintains about the records it keeps. Third, the optimized query may be able to take advantage of various methods for accessing the information sought. Thus, efficient prior-art optimizers have tended to be strongly dependent on the specific implementation of the data base system and on the specific digital data processing system in which they were employed. The effects of these dependencies have been threefold:

(1) The need for an extensive understanding of the data base system and the digital data processing system has made optimizers difficult to design and has increased the amount of time needed to create them.

(2) Optimizers have been difficult to maintain, both because they are complicated, and because those who maintain them need the same extensive understanding of the data base system and the digital data processing system as those who create them.

(3) Because of the dependencies of the optimizer on the implementation of the data base system and the digital data processing system, any change in either has required extensive modification of the optimizer. For this reason, it has also been difficult to adapt optimizers to different systems.

Code generators have the same dependencies as optimizers, and have been similarly difficult to design, maintain, and adapt. These problems of prior-art optimizers and code generators, and others as well, have been solved by the optimizer and code generator of the present invention.

SUMMARY OF THE INVENTION

The present invention is an optimizer and code generator which includes an implementation-dependent component called a scan analyzer and an implementation-independent optimizer and code generator. The scan analyzer receives data concerning the query from the optimizer and code generator and responds thereto by providing the optimizer and code generator with cost data about the cost of various alternative methods of accessing data and with implementation-dependent portions of the compiled query code. The optimizer and code generator uses the cost data to optimize the query and incorporates the implementation-dependent portions into the compiled query code which it produces.

Since only the present invention's scan analyzer is dependent on the implementation, the optimizer and code generator are more easily created, maintained, and adapted for use in other data base and digital computer systems than prior-art optimizers and code generators.

It is thus an object of the present invention to provide an improved data base system.

It is another object of the present invention to provide an improved query optimizer for use in a digital data base system.

It is a further object of the present invention to provide an improved code generator for use in a digital data base system.

It is yet another object of the present invention to provide optimizers and code generators which are more easily created, maintained, and adapted to other systems than those of the prior art.

It is a still further object of the present invention to provide an optimizer wherein cost information concerning various access methods is provided by an implementation-dependent scan analyzer.

It is an additional object of the present invention to provide a code generator wherein implementation-dependent code is provided by an implementation-dependent scan analyzer.

It is still another object of the present invention to provide improved methods of optimizing queries and generating query code.

Other objects, advantages, and features of the present invention will be understood by those of ordinary skill in the art after referring to the following detailed description of the preferred embodiment and drawings, wherein:

BRIEF DESCRIPTION OF THE DRAWINGS

FIG. 3 illustrates an optimized Cartesian product of the relation of FIG. 1;

FIG. 4 shows indexes for the relations of FIG. 1;

DESCRIPTION OF THE PREFERRED EMBODIMENTS

The description of the Preferred Embodiments begins with an overview of the data base system in which the present invention is employed, continues with an overview of prior-art techniques for achieving the objects of the invention, and then describes the present invention in detail.

1 Data Base Systems

A data base system is a computer-based record keeping system which allows users to perform operations such as locating, adding, deleting, and updating records stored in a computer system without any knowledge of how the information making up the records is actually stored in the computer.

Figure 1:
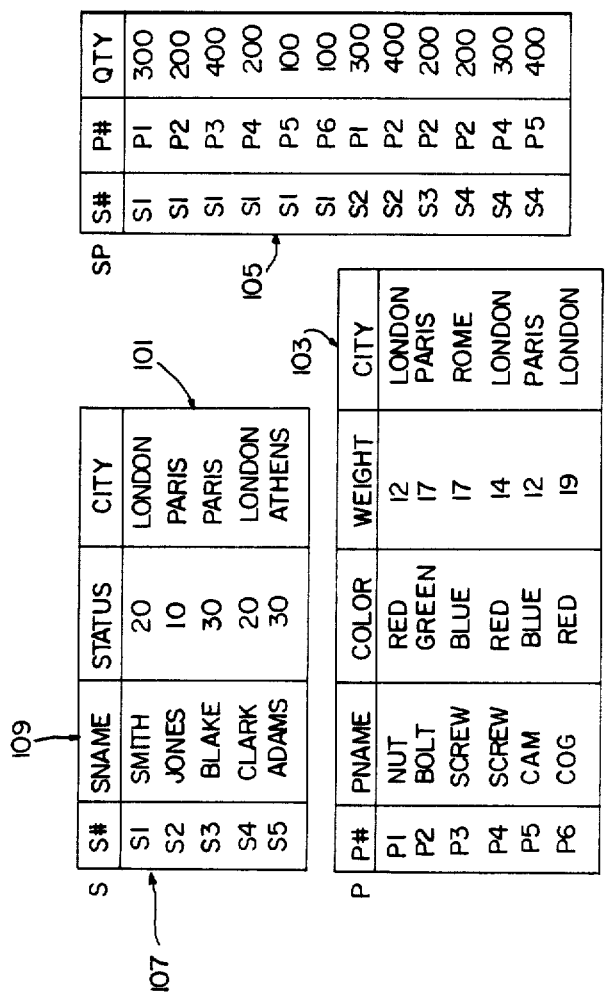
FIG. 1 is a drawing showing relations of the type used in the relational data base system in which the present invention is embodied.

1.1 Relational Data Base Systems—FIG. 1

One form of such a data base system is a relational data base system. In such a data base system, the stored information appears to the user as a set of tables. Each table is termed a relation, since it relates information to other information. FIG. 1 is a simple example of information as the user perceives it in a relational data base system. The information concerns suppliers and the parts they supply. There are three relations: S 101, which describes the suppliers, P 103, which describes the parts, and SP 105, which describes how many of each part each supplier has. In each relation, the information is arranged in rows 107 and columns 109. The names for the columns indicate the kind of information contained in them. CITY in S means the city in which the supplier is located; CITY in P means the city in which the parts are stored. Information may be obtained from the relations by specifying the relations which contain the information and restrictions on the relations. The restrictions describe what information is wanted from the relations containing the information. For example, the name of the supplier in London may be obtained by specifying the relation S and the restriction that the value of the column SNAME be returned from all rows in which CITY='London'.

More than one relation may be involved. For instance, obtaining the name of the supplier in London who can supply a nut requires the use of all three relations. P 103 relates the part name to the part number, SP 105 relates the part number to the supplier number, and S 101 relates the supplier number to the supplier name. In logical terms, the three relations are combined to form a Cartesian product relation in which each row of the Cartesian product contains all of the columns from each of the relations being combined and there is a row corresponding to each of the possible combinations of rows from S 101, P 103, and SP 105. The information to be returned in the query is then specified by means of the restriction on the Cartesian product that the value SNAME be returned for all rows of the Cartesian product in which the value in the column PNAME from P 103 equals 'Nut', the value in the column CITY from S 101 equals 'London', the value in the column S# from S 101 is the same as the value in the column S# from SP 105, and the value in the column P# from P 103 is the same as the value in the column P# from SP 105.

Users of a relational data base system specify the relations containing the data and the restrictions performed thereon by means of a query written in a data base programming language. In a present embodiment, the programming language employed is one known as "DML", and the DML query for the second of the above examples in a present embodiment looks like this:

SELECT S.SNAME FROM S,P,SP

WHERE
 P.PNAME='Nut' AND
 S.CITY='London' AND
 S.S#=SP.S# AND
 P.P#=SP.P#

As may be seen from the above, the columns containing the information sought and those whose values are relevant for the restriction are specified by the syntax <table name>.<column name>. The query in DML may be contained in a program written in another language such as COBOL or FORTAN, or it may be input from a computer terminal to an interactive program which uses the relational data base.

Figure 2:
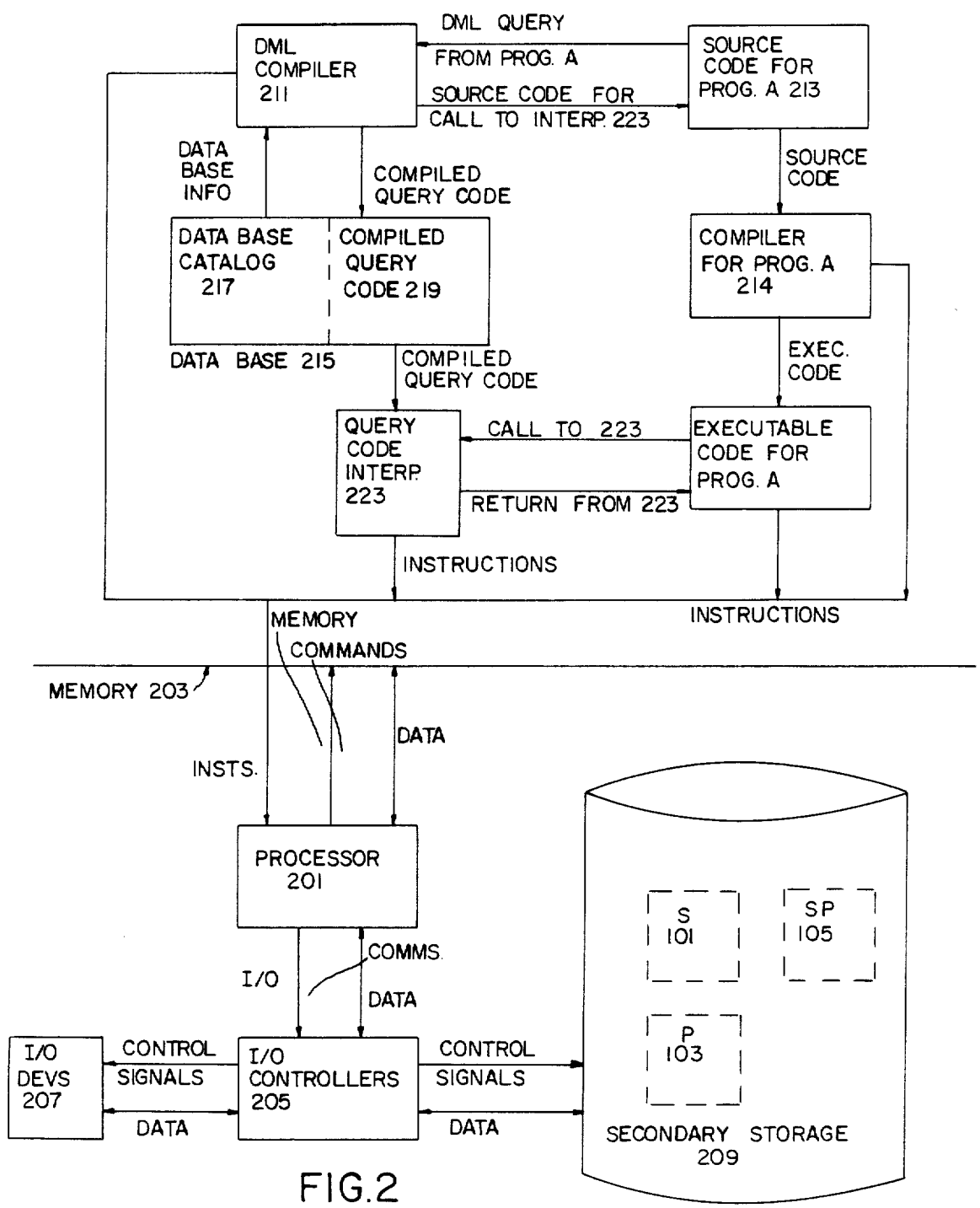
FIG. 2 is a conceptual drawing of a prior-art data base system.

1.2 Relational Data Base Systems in Digital Computer Systems—FIG. 2

FIG. 2 shows a typical prior-art relational data base system in a typical digital computer system. The digital computer system typically has five components:

(1) a processor 201 which performs operations in response to instructions and controls operation of the remaining components;

(2) a memory 203 connected to processor 201 which contains data currently being used by the processor. The data includes the instructions to which the processor responds and data upon which the processor performs operations. The memory provides data to the processor and stores data received from the processor in response to memory command signals from the processor;

(3) I/O (INPUT/OUTPUT) controllers 205 connected to processor 201 which respond to I/O instructions from the processor and control devices for inputting data to the processor and receiving data from the processor.

(4) Input/output devices 207 such as CRTs (Cathode Ray Tubes), card and tape readers, and printers connected to I/O controllers 205. Users of the system system can provide data to the system and receive outputs from the system by means of these devices.

(5) Secondary storage 209, in which is stored data not presently being processed by processor 201. Secondary storage 209 is also connected to I/O controllers 205. Secondary storage 209 consists typically of one or more disk drives.

As shown by the arrows in FIG. 2, processor 201 thus receives data from and provides data to I/O controllers 205 and memory 203, receives instructions from memory 203, provides memory commands to memory 203, and I/O commands to I/O controllers 205. I/O controllers 205 receive data from and provide data to I/O devices 207 and secondary storage 209 and provide control signals to those devices.

During operation of the data processing system, Processor 201 first moves data and instructions in relatively large blocks from secondary storage 209 to memory 203, then processes the data, and then returns it to secondary storage 209. In many digital data processing systems, I/O controllers 205 are themselves able to read data directly from memory 203 or write it directly to memory 203, and in such systems, I/O controllers respond to I/O commands from processor 201 by transferring data directly between memory 203 and secondary storage 209.

Secondary storage 209 is organized into files managed by programs making up a file management system (not shown in FIG. 2). Data is moved to or from files when processor 201 executes programs belonging to the file management system. The file management programs move the data by by specifying a location in the file to I/O controllers 205, which then causes the devices making up secondary storage 209 to provide or receive the specified data as indicated above.

When the digital data processing system is functioning as a relational data base system, at least some of the files in secondary storage 209 contain relations. In FIG. 2, the relations S 101, P 103, and SP 105 are shown in Secondary Storage 209. The programs and data required for operation of the relational data base system are either permanently resident in Memory 203 or provided from Secondary Storage 209 as required. The programs and data make up the following major components of the relational data base system:

(1) The DML compiler, a program which receives a query in DML as input and produces compiled query code 219 as an output;

(2) Data base 215, which contains the information required to perform data base operations on relations stored in files in secondary storage 209. The information includes data base catalog 217, which contains information about the relations making up the data base, and compiled query code 219.

(3) Query code interpreter 223, which receives compiled query code 219 and interprets it to provide instructions to processor 201 to which processor 201 responds by executing the operations required by the data base system.

Also contained in memory 203 in FIG. 2 are source code 213 for a program A containing a query in DML, a compiler program 221 for the language in which program A is written, and executable code for program A which compiler program 215 has produced from source code 213 for program A.

Flows of data and instructions are illustrated by arrows; it is however always to be understood that the flows in fact occur via processor 201. Instructions move from the programs to processor 201, which then executes the instructions, and when data is shown moving to or from a component, what in fact occurs is that processor 201 fetches the data from or provides the data to the component in question while executing a program. Thus, when processor 201 is executing DML compiler 211, it reads source code 213, compiles any DML queries it encounters, and stores the resulting query code in data base 215.

1.3 Operation of the Relational Data Base System

The relational data base system whose components are shown in FIG. 2 operates as follows:

When a user of the digital computer system has written source code 213 for a program A containing a DML query, he compiles the program using DML compiler 211 before he compiles it with compiler 221 for the language in which program A is written. DML compiler 211 searches source code 213 for queries in DML; when it finds one, it uses data base catalog 213 to determine what relations are specified in the query and to obtain whatever information data base catalog 213 contains about those relations. Using that information, DML compiler 211 transforms each DML query into compiled query code 219, which is stored in data base 215. It then places a call in the language of source code 213 to query code interpreter 223 into source code 213. The call includes an argument which represents the location of the compiled query code for the query in data base 215.

When DML compiler 211 is finished, compiler 221 for program A's language compiles source code 213 to provide executable code 227. Whenever it encounters a call to query code interpreter 223, it produces instructions corresponding to the call. When executable code 227 is then executed by processor 201 and processor 201 executes one of the calls to query code interpreter 223, query code interpreter 223 uses the argument to locate the compiled query code 219 corresponding to the call and interprets that code to produce instructions which are then executed by processor 201. As specified by the instructions, processor 201 performs the operations on files S 101, SP 105, and P 103 required by the query.

In the above example, the query was part of source code 213; alternatively, it may be received from a program which allows users to make queries from their terminals. In such a case, the program which provided the query invokes DML compiler 211 which produces query code from the query as described above. However, DML compiler 211 does not store the compiled query code in Data Base 215; instead, it immediately provides the compiled query code to query code interpreter 223, which then interprets the query as just described.

2 Optimizing Queries

While any query may be solved by forming the Cartesian product of the the relations involved and then performing a restriction on the Cartesian product, a data base system which used only that technique would be hopelessly inefficient.

First, if relations of any size are involved, the Cartesian product soon becomes unmanageably large. For example, the Cartesian product of S 101, P 103, and SP 105 has 360 rows of 12 columns each. The product is derived as follows: there are 5 rows in S 101 and 6 in P 103; thus, there are thus 6×5 or 30 possible rows formed by combining rows from the two relations. Each of the 30 combined rows may in turn by combined with each of the 12 rows of SP 105; thus, there are 360 possible rows formed by combining rows from S 101, P 103, and SP 105. When the restriction is performed, each of the 360 rows must be examined to determine whether it fulfills the requirements of the restriction.

Second, even where there is only a single table, and therefore the Cartesian product is the table itself, each row of the table must be individually examined to determine whether it fulfills the condition of the restriction. Even if a row which satisfies the restriction is found, the remaining rows must be examined, since there is no way of knowing from a given row whether it is the only one which satisfies the restriction. Thus, even though it is clear from looking at S 101 that a given value of column S# appears in only 1 row, all of relation S 101 would have to be searched.

While there are some queries which may only be solved by performing a restriction on a Cartesian product, for many others, there are alternative methods of solving them which are more efficient. The technique of transforming a given query into a form which is logically equivalent to the given query but which may be executed more efficiently is termed query optimization, and the programs which perform query optimizations are termed query optimizers. Generally speaking, query optimizations may take place at two levels: first, the entire logical form of the query may be restructured; second, each operation involved in solving the query may be optimized. The latter optimizations may involve special algorithms for the operations, may take advantage of information about the relations involved in the query which is available in data base catalog 217, or may take advantage of special characteristics of the implementation of the data base system.

2.1 Optimizing the Logical Form of the Query

An example of optimizing the logical form of the query is performing the restrict operations before the Cartesian product is formed. The Cartesian product then need only be formed from the results of the restrict operations. For instance, in the example query above, there is only one row of P 103 in which P.PNAME='Nut'. Thus, if the PNAME='Nut' restriction is performed on P before the Cartesian product is formed, it is clear that there is only one P#, namely P1, which is of interest. Similarly, if the S.CITY='London' restriction is performed on S 101 before the Cartesian product is formed, it is clear that only the rows 107 with S#=S1 and S#=S4 meet the requirement that S.CITY='London'. Since the only combinations of P# and S# which meet the requirements of the two restrict operations are S1, P1 and S4, P1, a restrict operation may be performed on SP 105 to locate the rows 107 having those combinations of S# and P#. It turns out that there is only one such row 107, namely the one for S1,P1, and thus, at the end of the process, the Cartesian product is of the single row 107 of S for S1 with the single row 107 of P for P1 and the single row 107 of SP for S1, P1. That row 107, which is shown as optimized Cartesian product 303 in FIG. 3, of course contains the desired information that the name of the supplier of the part 'Nut' in London is Smith.

2.2 Optimizations using Information from Data Base Catalog 217—FIG. 4

Data base catalog 217 contains information about the relations making up a data base. Among the information it contains is a list of indexes to the relations. An index is a table which relates values in one or more of a relation's columns to data base row identifiers (DRID) which identify the rows 107 of the relation in which the columns have the specified values. For example, FIG. 4 shows an S# index for relation S 101, a P# index for relation P 103, and an S#,P# relationship for SP 105. Each value of the S# column is related in the index to the DRID (represented by a letter in parentheses) of the row 107 in S which has that value of S#. The values used in an index are termed keys, and if a given value of a key specifies only a single row 107 of the relation, then the key is a primary key. In FIG. 4, S# is a primary key of S, P# is a primary key of P, and S#,P# are a primary key of SP. As the latter index shows, a primary key may be made up of values from more than one column.

The advantage of an index is that when it exists and a restriction involves a value that is a key, the index may be used to determine whether there is in fact a row 107 for the specified value, and if there is, the row 107 may be retrieved by specifying the relation and the DRID given in the index. It thus becomes unnecessary to retrieve all of the rows 107 from a relation in order to find the rows 107 which satisfy the restriction. Thus, in the example, S#,P# is a primary key of SP, and once it is known from the restrictions on S and P that the only possible combinations of S# and P# are S1 and P1 and S4 and P1, S#,P# index 405 may be used to determine that there is in fact only one such combination, namely S1,P1. Further, since S1, P1, and S1,P1 are keys for indexes on S, P, and SP respectively and the indexes specify the DRIDs of the relevant rows 107 in the relations, only the relevant rows 107 need be fetched from Secondary Storage 209 to form the Cartesian product.

Figure 5:
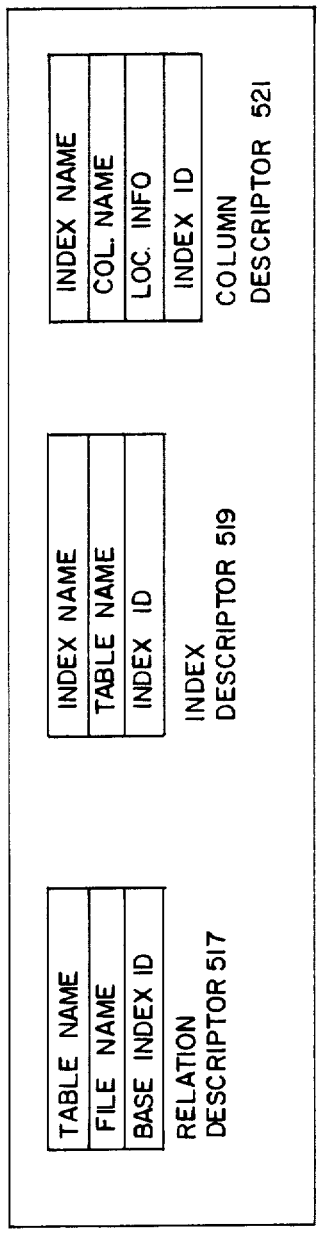
FIG. 5 shows an implementation of relation S 101.
Figure 5:
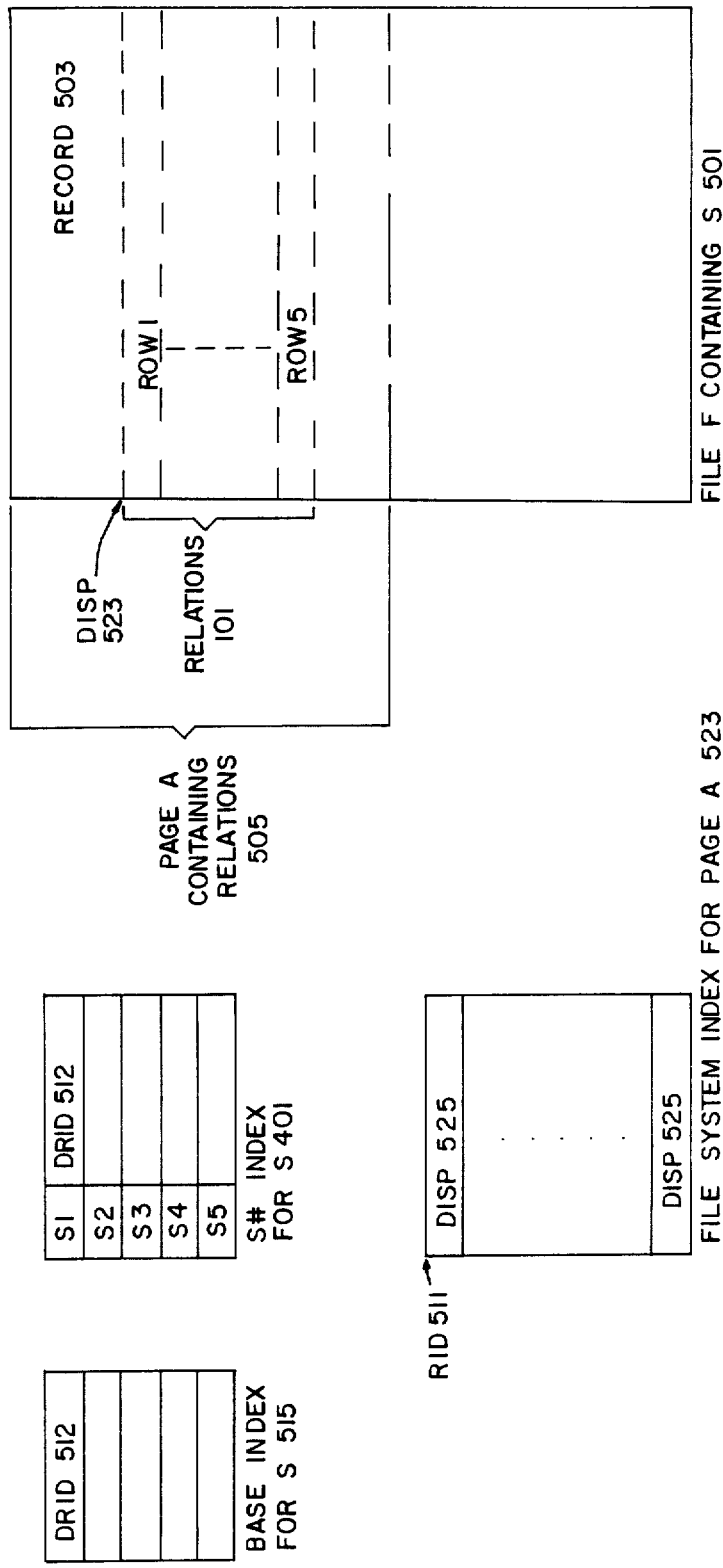

2.3 Optimizations involving Storage of Information in Secondary Storage 209—FIG. 5

The speed with which a query is executed also involves the manner in which the digital data processing system stores data on and retrieves it from from Secondary Storage 209. That function is performed in the digital data processing system by the file system. FIG. 5 gives a schematic overview of how a typical file system would store relation S 101 in Secondary Storage 209.

Relation S 101 is stored in a file F 501 which is made up of a sequence of records 503. In the portion of file F 501 containing S 101, each record 503 contains the information from one row 107 of S 101. Relation S 101 is further located on a page 505 which may be fetched into memory 203 in a single operation. Larger relations might occupy more than one page.

The file system locates records 503 by means of RIDs (Row Identifiers) 511. In a present embodiment, each RID specifies the page 505 containing the record 503 and a location in an index 523 for the page. At the specified location in index 523, there is a value which is the displacement 525 of the record represented by RID 511 in page 505. As previously indicated, the data base system uses DRIDs 512 to identify rows 107. A component of query code interpreter 223 converts DRIDs 512 to RIDs 511 and provides the RIDs 511 to the file system. In addition to using DRIDs 512 in indexes, as previously described and shown in S# index 401, data base catalog 217 includes a base index 515 for each relation. Base index 515 contains DRID 512 for each of the rows 107 in the relation to which the base index belongs.

The file containing a relation, the relation's base index 515, and any other indexes for the relation are locatable from data base catalog 217 as shown in FIG. 5. The information in data base catalog 217 for a given relation includes relation descriptor 517, from which the file containing the relation and the relation's base index may be located, an index descriptor 519 for each index defined over the relation which indicates how the index may be located, and a column descriptor 521 for each column 109 whose values are used in an index over the relation. Column descriptor 521 indicates how the index which uses the column 109 may be located and further specifies the location of column 109 in the index which uses it.

The query optimizer may be able to provide information in compiled query code 219 to query code interpreter 223 which allows query code interpreter 223 to take advantage of the information in data base catalog 217 and of the manner in which the file system stores and retrieves files. For example, if all of the rows 107 of a relation are required for a query and the relation is stored on a single page 505, it is clearly faster to fetch the entire page 505 into memory 203 than to fetch the rows 107 using base index 515 to obtain the DRID 512 for each row 107, converting the DRID 512 to the RID 511 for the record 503 containing the row 107, and fetching the record 503 into memory 203. Further, if there is an index available for a column whose values are used in a restriction, it is more efficient to use the index to obtain the DRIDs 512 for the relevant rows 107 and use the DRIDs 512 to fetch the records 503 corresponding to the rows 107 than it is to fetch all of the records 503 in the relation.

It may be possible for the optimizer to use other characteristics of the manner in which the file system fetches data to reduce the time required to solve a query. For example, DML also allows a user to specify that the information satisfying a query be returned to him in a specific order. In that case, query code interpreter 223 will sort the data after it has fetched it. However, If there is an index available for the relation which is in the desired order, DRIDs 512 may be provided in order from that index, and the file system will provide the records 503 in that order, thereby eliminating the need for query code interpreter 503 to sort the information. Further, in some embodiments, the file system may return records 503 in the order in which they are stored in File F as well as returning them in response to RIDs 511. In such embodiments, all of the rows 107 in a relation may be obtained without resort to base index 515 for the relation.

2.4 Combining Optimization Techniques

In general, a query optimization will involve several of the above techniques. For example, where the query requires a Cartesian product, the optimizer performs restrictions before forming the Cartesian product to the extent possible. Then the optimizer examines the data base catalog to see whether there are any indexes for the relation which have keys used in the restriction. If there are some, the optimizer can specify that the keys be used to fetch the records 503 corresponding to the relevant rows 107. If there are no indexes, the optimizer determines what the most efficient manner is of fetching all of the records in the file into memory 203. The optimizer then generates compiled query code specifying the most efficient manner of solving the query.

Figure 6:
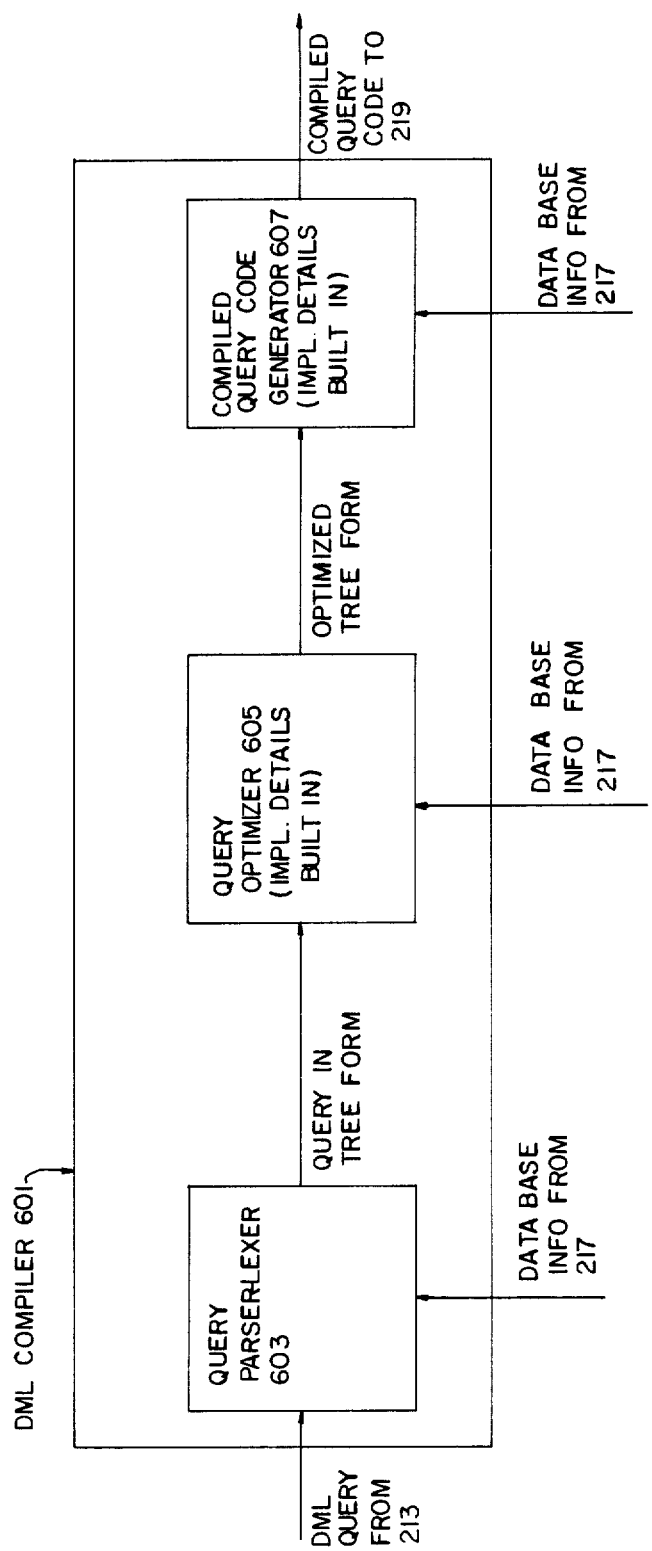
FIG. 6 shows a prior-art DML compiler.

3 Prior-art DML Compilers—FIG. 6

Optimization is performed by components of DML Compiler 211. FIG. 6 provides a schematic overview of DML Compiler 601, a typical prior-art DML Compiler 211. DML Compiler 601 has three main components:

(1) Query Parser and Lexer 603, which receives a query in DML, parses it, interprets relation and column names using data base catalog 217, interprets restriction operators, and converts the query into a standard tree data structure which can be interpreted by the other components of compiler 601.

(2) Query optimizer 605, which receives the tree data structure from query parser and lexer 603 and uses information from data base catalog 217 to produce an optimized version of the tree data structure if optimization is possible.

(3) Compiled query code generator 607, which receives the optimized tree data structure from query optimizer 605 and uses further information from data Base catalog 217 to produce compiled query code, which is output to data base 215.

In the prior-art DML compiler 601, each component requires information from data base catalog 217; further, since various optimizations are dependent on the manner in which the file system stores and retrieves data from secondary storage 209 and on the manner of operation of the digital data processing system, query optimizer 605 and compiled query code generator 607 are strongly dependent on a specific file system and digital data processing system.

Consequently, if there is a change in the implementation of data base catalog 217, a change in the file system, or a change in the digital computer system, large portions of DML compiler 601 must be rewritten. Similarly, extensive rewriting is required if the data base system is to be used on a different a digital data processing system or merely one having a different file system.

4 Methods of Optimization in Data Base Systems—FIGS. 7-10

In the following, typical methods of optimization in data base systems are presented, beginning with an overview of the manner in which the data base system in which the present invention is embodied takes a tree data structure termed the Base Logical Form (BLF) and optimizes it. Once again, the example query

SELECT S.SNAME FROM S,P,SP

WHERE
    P.PNAME='Nut' AND
    S.CITY ='London' AND
    S.S#=SP.S# AND
    P.P#=SP.P#
will serve as the basis of the discussion.

Figure 7:
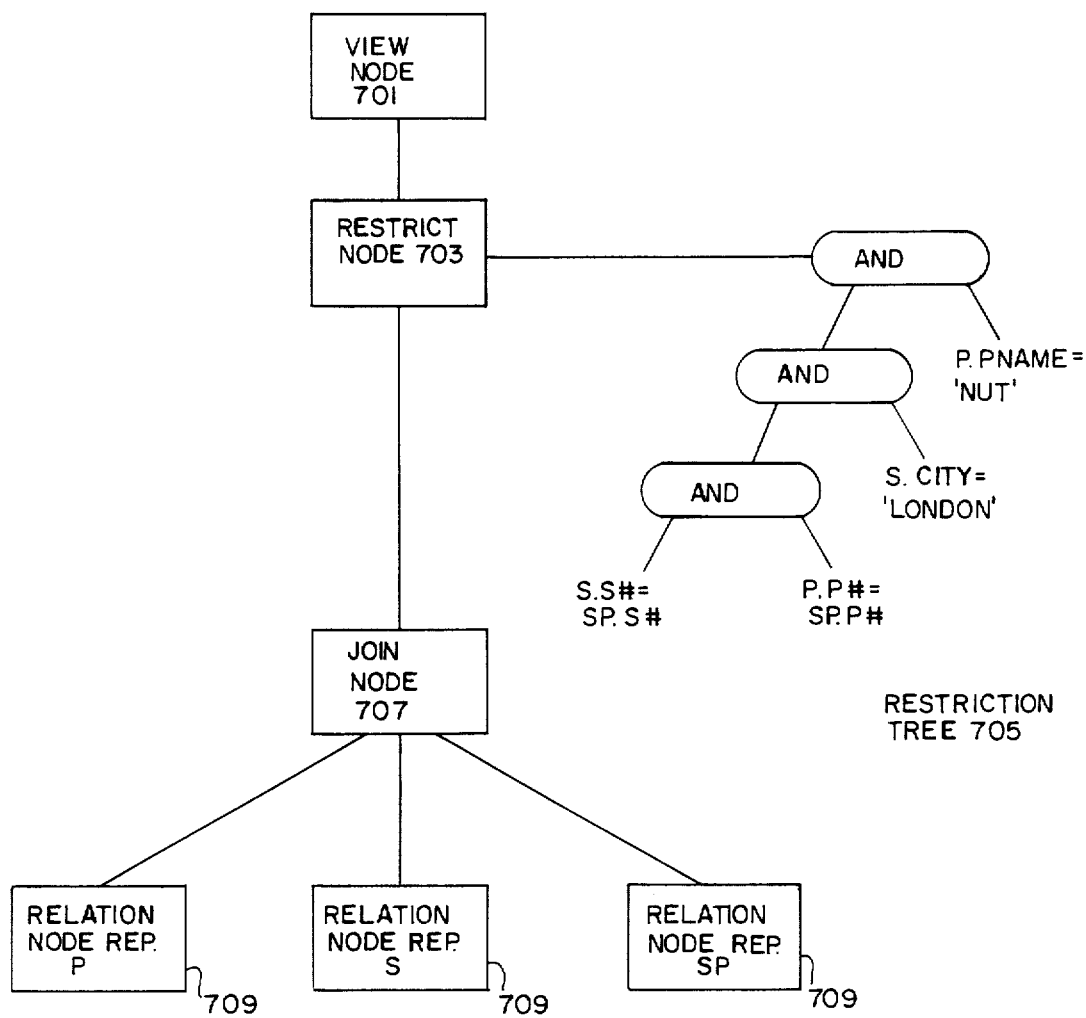
FIG. 7 shows the BLF (Base Logical Form) form of a query in a present embodiment.

FIG. 7 shows the BLF for the example query in a present embodiment. The BLF is a tree of nodes. Each node represents a set of rows 107. Each node but the bottommost or leaf nodes has a source for the set of rows 107 which it represents. The leaf nodes obtain their rows 107 directly from relations which are contained in files in secondary storage 20. Beginning with the topmost node, view node 701 represents the final result of the query, namely the name of the dealer in London who sells nuts. The source of view node 701 is restrict node 703, which represents the rows 107 resulting from the restriction of the WHERE clause on the source of restrict node 703, which is join node 707. Restriction tree 705 is attached to restrict node 703 and represents the logical operations specified for the restriction. As is usual with trees which represent operations, each branch of the tree represents an operand for the operator at the junction of the branches.

Join node 707 represents the Cartesian product of its sources, namely the relation nodes 709 for relation P 103, relation S 101, and relation SP 105. Each of the relation nodes represents all of the rows 107 in the specified relation. Thus, the BLF exactly represents the unoptimized query operation previously described: Relation nodes 709 represent P 103, S 101, and SP 105, join node 707 represents their Cartesian product, restrict node 203 represents the rows 107 of the Cartesian product resulting from the restriction operation, and view node 701 represents the information sought by the query from the results of the restriction operation.

4.1 Optimizations of the BLF Tree

Figure 8:
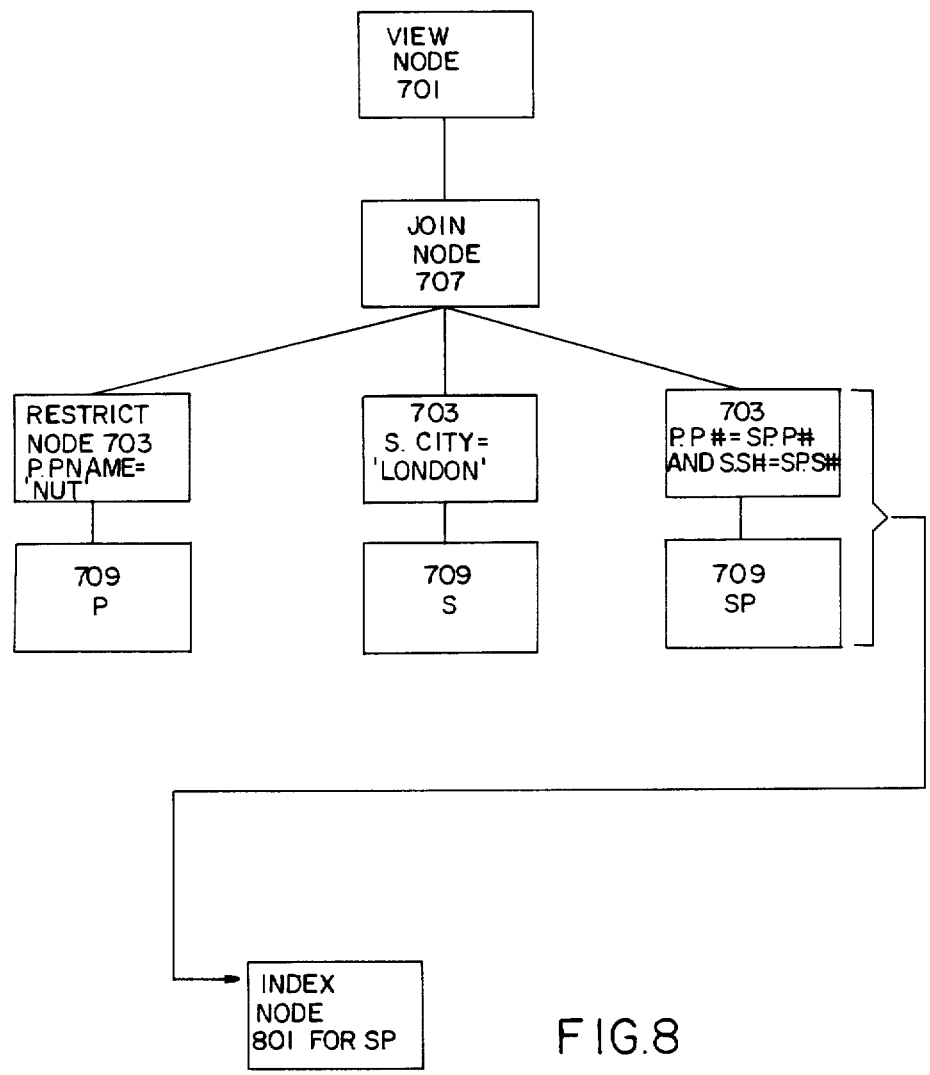
FIG. 8 shows the optimized BLF form of a query in a present embodiment.

As previously pointed out, the logical form of the example query may be optimized by performing the restrictions before the join. FIG. 8 shows the result of this optimization in the BLF tree. View node 701 and Join node 707 remain, but restrict node 703 has been replaced by separate restrict nodes 703 restricting relation nodes 709 for P 103, S 101, and SP 105. Join node 707 now no longer represents the Cartesian product of P 103, S 101, and SP 105, but instead the Cartesian product of the restrictions on those nodes specified by the three restrict nodes 703.

Thus, in FIG. 8, the rows 107 represented by the join is the Cartesian product of the rows 107 specified by relation node 709 for P and the restriction node 703, P.PNAME='Nut', the rows 107 specifed by relation node 709 for S and the restrict node 703 S.CITY='London', and the rows 107 specified by relation node 709 for SP as restricted by restrict node 703, P.P# = SP.P# AND S.S# = SP.S#. Since restrict node 703 of the unoptimized BLF tree ANDed all of the restrictions, the only relevant values of P.P# and S.S# for restrict node 703 P.P# = SP.P# AND S.S# = SP.S# are those from the restrictions on S 101 and P 103, and only those rows 107 belong to the Cartesian product. Thus, the result of the BLF tree of FIG. 8 is the same as the result of the BLF tree of FIG. 7 and the two are logically equivalent. —

If a restriction involves constant values which are indexes in relations, a further optimization is possible: the relation node 709 may be replaced by an index node 801. Index nodes 801 are nodes which represent the rows 107 of a relation which contain a specified index value. Since the index may be searched for the index value and the relevant rows 107 fetched using DRIDs 512 contained in the index, there is no need to read all of the rows 107 in the relation.

In the example of FIG. 8, P#,S# is an index of SP 105; further, when the restrict operation represented by restrict node 703 for relation node 709 for SP is performed, the relevant values of P.P# and S.S# are known; thus, the restriction P.P# = SP.P# AND S.S# = SP.S# involves constants, and restrict node 703 and relation node 709 for SP may be replaced by index node 801. If the restriction additionally involved values which were not index values, then the optimization would replace restrict node 703 and relation node 709 for SP with an index node 801 and a restrict node 703 which contained those portions of the restriction which did not involve indexes. In such a situation, the remaining restrictions represented by restrict node 703 would be performed on the rows 107 represented by index node 801.

Figure 9:
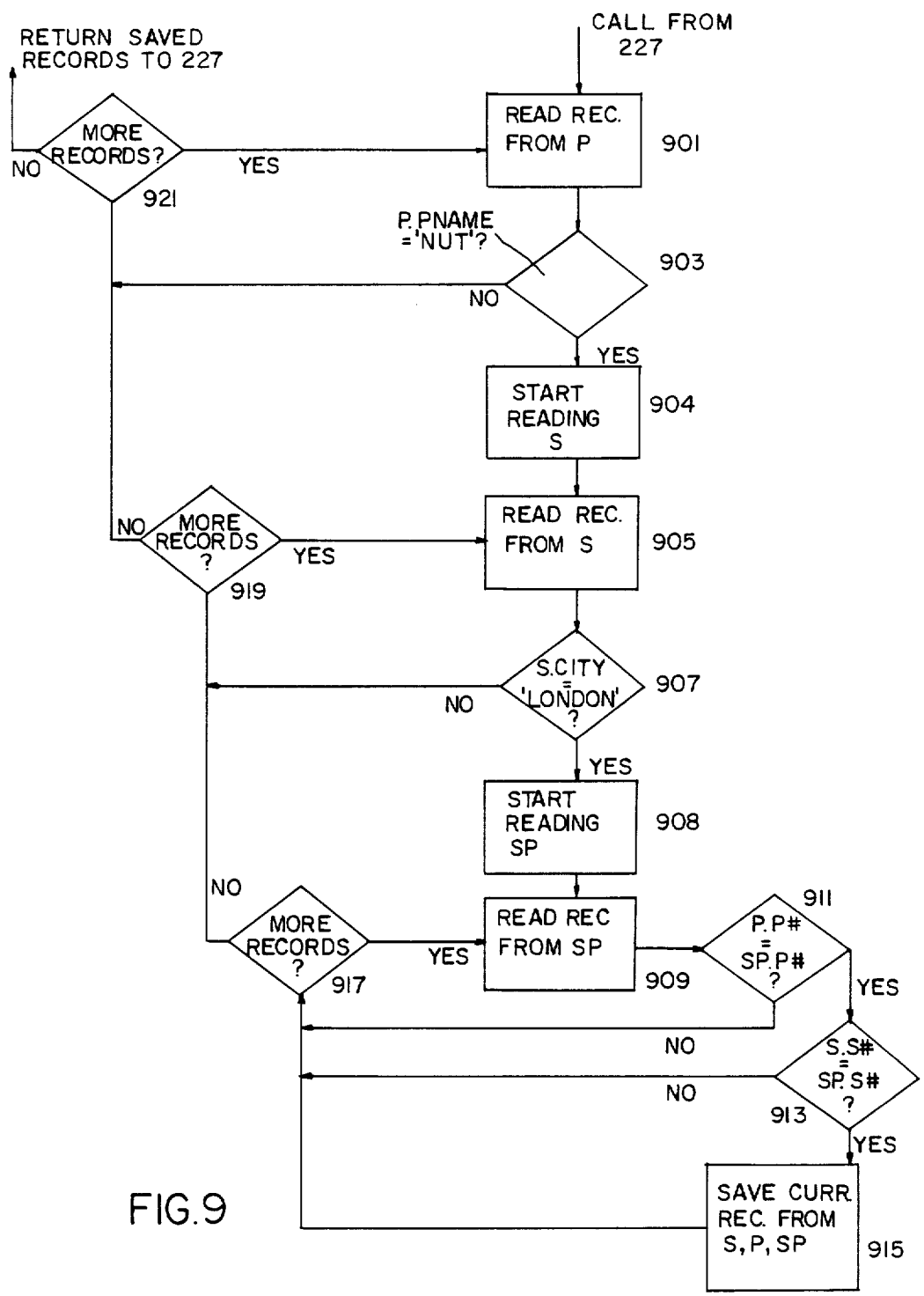
FIG. 9 is a flowchart for an action performed by executable query code of the present invention.

As shown in FIG. 6, the optimized tree serves as an input to compiled query code generator 607. The compiled code actually generated of course depends upon the kind of digital data processing system in which the data base system is implemented. In some implementations, the compiled code may be code which is directly executable by the digital data processing system; in others, the compiled code may be interpreted by a component of the data base system, as exemplified by query code interpreter 223 in FIG. 2. For purposes of the present discussion, the compiled code is represented by the flowchart of FIG. 9 showing operations typically performed by the compiled query code corresponding to the example query. Numbers in parenthesis in the discussion refer to boxes in the flowchart.

As shown in FIG. 2, the operations may be commenced by a call from executable code 227 for program A. The first step is to read records 503 beginning with the first record 503 from relation P (901). In each record 503, P.PNAME is examined to see if it has the value 'Nut' (903). If it does not, the next record 503 is read from relation P 103. If it does, records 503 beginning with the first (904, 905) are read from relation S 101. In each record 503, S.CITY is examined to see if it has the value 'London' (907). If it does not, the next record 503 is read from relation S 101. If it does, records beginning with the first are read from relation SP 105 (908,909). For each record, SP.P# is examined to determine whether it has the same value as P.P# of the current record 503 from P (911) and SP.S# is examined to determine whether it has the same value as S.S# of the current record 503 from S 101 (913). If that is the case, the current records 503 from S 101, P 103, and SP 105 are saved (915); otherwise, the next record 503 of SP 105 is read. When all of the records 503 from SP 105 have been read for the current record 503 of S 101, the next record 503 of S 101 is read and examined as just described; when all of the records 503 from S 101 have been read for the current record of P 103, the next record 503 of P 103 is read and examined as just described.

4.2 Further Optimizations involving the Optimized BLF and the Compiled Query Code In a present embodiment, the optimized BLF of FIG. 8 is further optimized by placing index nodes 801 without restrict nodes 703 above them or relation nodes 709 having restrict nodes 703 with restrictions containing only constants above them to the left of other nodes 709 which are sources for the same join node 709.

There are two advantages of this kind of optimization. Both may be seen from FIG. 9. First, as the flowchart shows, the compiled query code is a set of nested loops in which the outer loop corresponds to the leftmost relation node 709, the first nested loop corresponds to the relation node 709 adjacent to the leftmost relation node 709, and so forth. Consequently, if a relation node 709 or index node 801 has no rows 107 which satisfy the restriction, the inner loops need not be executed. Further, since it is possible in the case of a restriction involving a key in an index to determine from the index whether there are rows 107 satisfying the key value, index nodes 801 involving only constant restrictions are moved to the left of relation nodes 709 involving only constant restrictions. Finally, if the key value used in a restriction for an index node 801 is a primary key, that index node 801 is moved to the left of other index nodes 801, since there is no need to search for further rows 107 once the primary key value satisfying the restriction is found.

The second advantage is that the values in the rows 107 returned by an outer loop are constants during the execution of an inner loop. Thus, as is shown by the restriction P.P# = SP.P# AND S.S# = SP.S# of FIG.

7, a restriction which, taken abstractly, does not involve only constants, may in fact involve only constants in each concrete case in which it is applied. When that is the case, the relation node 709 may be replaced by an index node 801, as shown in FIG. 8.

In a present embodiment, a restriction may specify a value for DRID 512 representing a row 107. Further, there are nodes called DRID nodes which represent the row 107 specified by DRID 512. DRIDs 511 are effectively primary keys provided by the data base system, and consequently, the DRID node is logically equivalent to an index node 801 involving a primary key. However, since retrieval of a row 107 using a DRID 511 is faster than retrieval using a nonDRID primary key, DRID nodes will be moved to the left of the index nodes. Thus, in a present embodiment, when there is a choice among DRID nodes, index nodes 801 involving primary key values, ordinary index nodes 801, or relation nodes 709 with restrictions involving only constants, the DRID nodes are the leftmost nodes, then come the index nodes 801 with primary key values, then ordinary index nodes 801, and finally relation nodes 709 with restrictions involving constants.

Figure 10:
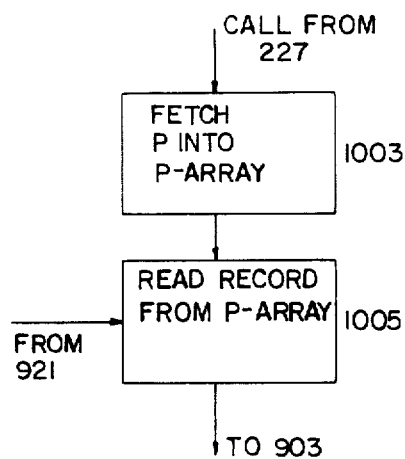
FIG. 10 is a flowchart of optimizations of executable query code of the present invention.
Figure 10:
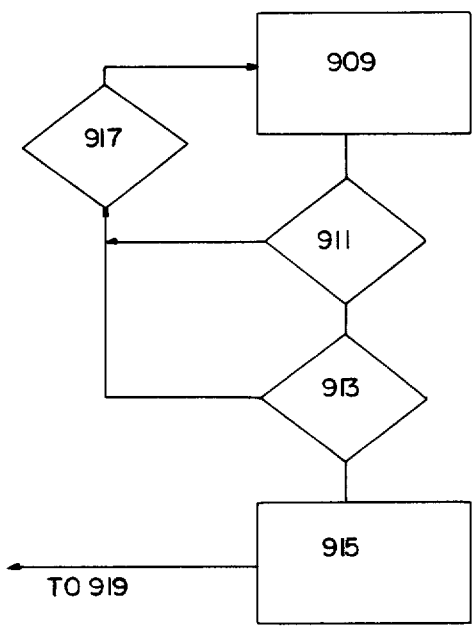

The compiled query code represented by FIG. 9 may be itself optimized as shown in FIG. 10. For example, if it is known that relation P is on a single page, optimization 1001 is possible: the code generator may replace the step of reading a record from P with the steps of fetching all of the records from P into an array in memory 203 (1003) and then reading the records from the array instead of from the file (1005). The same may be done with any relation or part of a relation which is on a single page. Further, if the constant in a restriction is a primary key, optimization 1007 is possible. There, since it is known that there can only be a single row 107 of the relation corresponding to the primary key, there is no need to continue searching after the row 107 containing the primary key has been located.

The preceding discussion and figures have shown the advantages of optimization and presented some of the optimization techniques employed in a system in which the present invention is embodied. The end effect of optimization is to create a query operation which is logically equivalent to the query operation specified by the DML being compiled, but which is more efficient to execute than the operation directly specified by the query. Thus, the optimizer must be able to produce logical equivalents to the original DML operation and must be able to determine which of the logical equivalents is most efficient. In order to do so, it must take into account the original DML query, the information available about the data base being queried in data base catalog 217, the characteristics of the file system used by the data base system, and the characteristics of the digital computer system upon which the data base system operates. Generally speaking, the more closely tied an optimizer is to the digital computer system and file system upon which the data base system operates, the more efficient the queries it produces. At the same time, the optimizer should be easily adapted for use with other file systems and digital computer systems and should be easily maintainable. In order to attain these objectives, an optimizer should not be closely tied to the digital computer system and file system upon which the data base system operates. The optimizer of the present invention in large measure reconciles these contradictory objectives.

5 The Query Code Interpreter and DML Compiler of the Present Invention

The discussion of the present invention will begin with overviews of the query code interpreter and DML compiler of the present invention and will then present details of a present embodiment of the invention.

Figure 11:
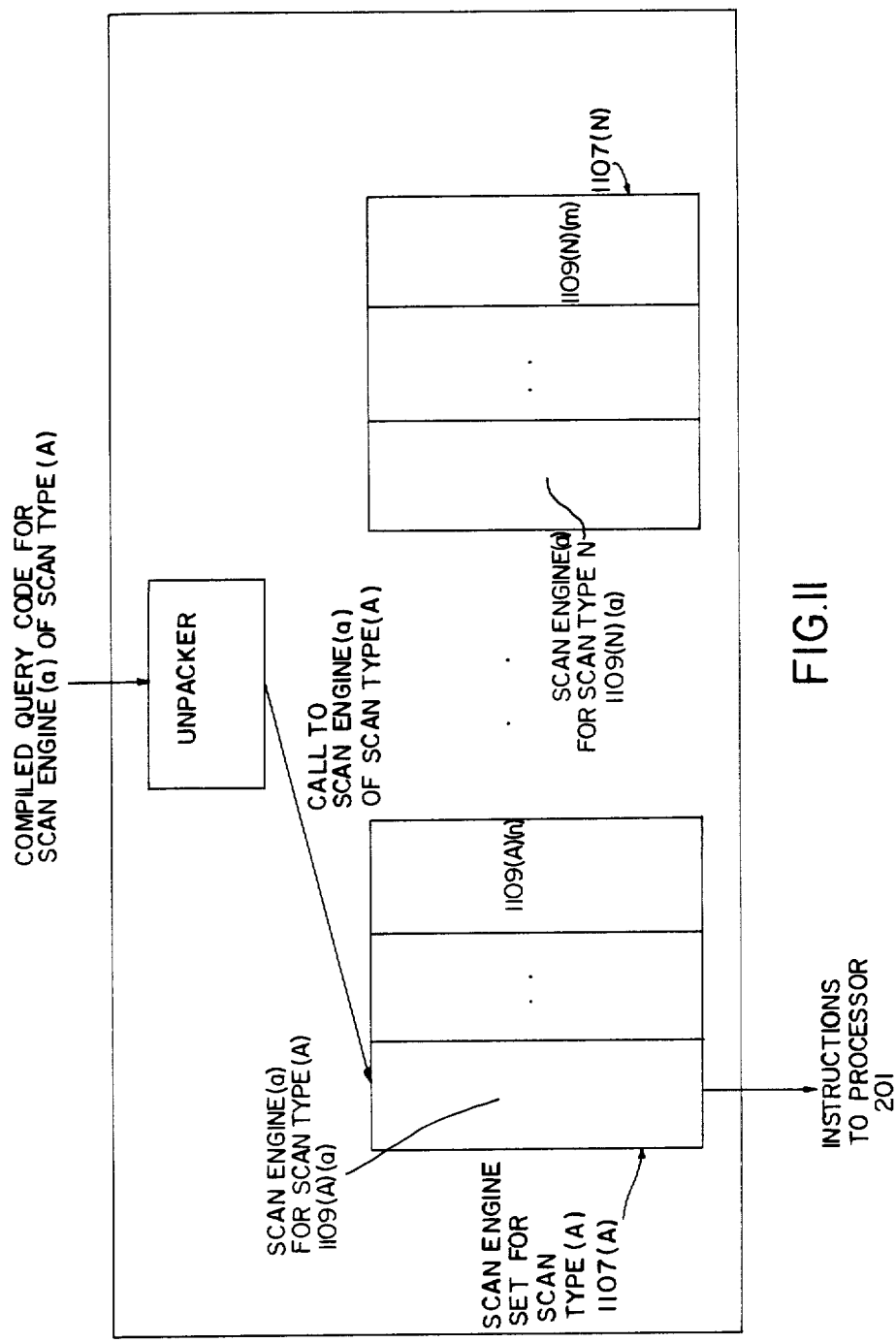
FIG. 11 is a conceptual drawing of the query code interpreter of a present embodiment of the invention.

5.1 Query Code Interpreter 1101 of the Present Invention—FIG. 11

FIG. 11 is a schematic representation of query code interpreter 1101 of the present invention. Query code interpreter 1101 performs the same function as query code interpreter 223 of FIG. 2, i.e., it receives compiled query code from data base 215 and produces therefrom instructions executable by the data processing system upon which the data base system is implemented.

Query code interpreter 1101 includes a plurality of scan engines 1107 and an unpacker 1103. Each scan engine 1107 returns the records 503 represented by a node of a BLF tree. The plurality of scan engines is subdivided into sets of scan engines 1107. Each set of scan engines 1107 includes all of the scan engines 1109 for returning the records 503 represented by a specific type of node in a BLF tree. What sets of scan engines 1107 are available and what scan engines 1109 they contain will vary from embodiment to embodiment of the invention, depending on the kinds of nodes contained in the BLF tree, the kind of file system used in the digital data processing system in which the data base system is implemented, and the manner in which data may be fetched from secondary storage 209 in the digital data processing system in which the data base system operates.

Examples of sets of scan engines 1107 in a present embodiment include those for index nodes 801 and relation nodes 709. Among the scan engines 1109 in the set for index nodes 801 a scan engine 1109 for use when the restriction for the index node 801 involves a single primary key value, and thus specifies that only a single row 107 will be returned, and another scan engine 1109 for use with indexes which return multiple rows 107. Among the scan engines 1109 for relation nodes 709 are a scan engine 1109 which reads an entire page 505 containing a relation into memory 203 and then provides individual rows 107 from memory and a scan engine 1109 which returns all of the rows 107 in the order specified by the base index 515 for the relation.

Unpacker 1103 receives compiled query code corresponding to the BLF tree from data base 215 (or directly from DML compiler 211 in the case of an interactive query) and responds to the compiled query code for each node by calling the scan engine 1109 specified in the compiled query code and providing scan engine 1109 with the information it needs to locate the rows 107 represented by the BLF node corresponding to the compiled query code. When the instructions of the called scan engine are executed by processor 201, the rows 107 represented by the node of the BLF tree are fetched from secondary storage 209.

Figure 12:
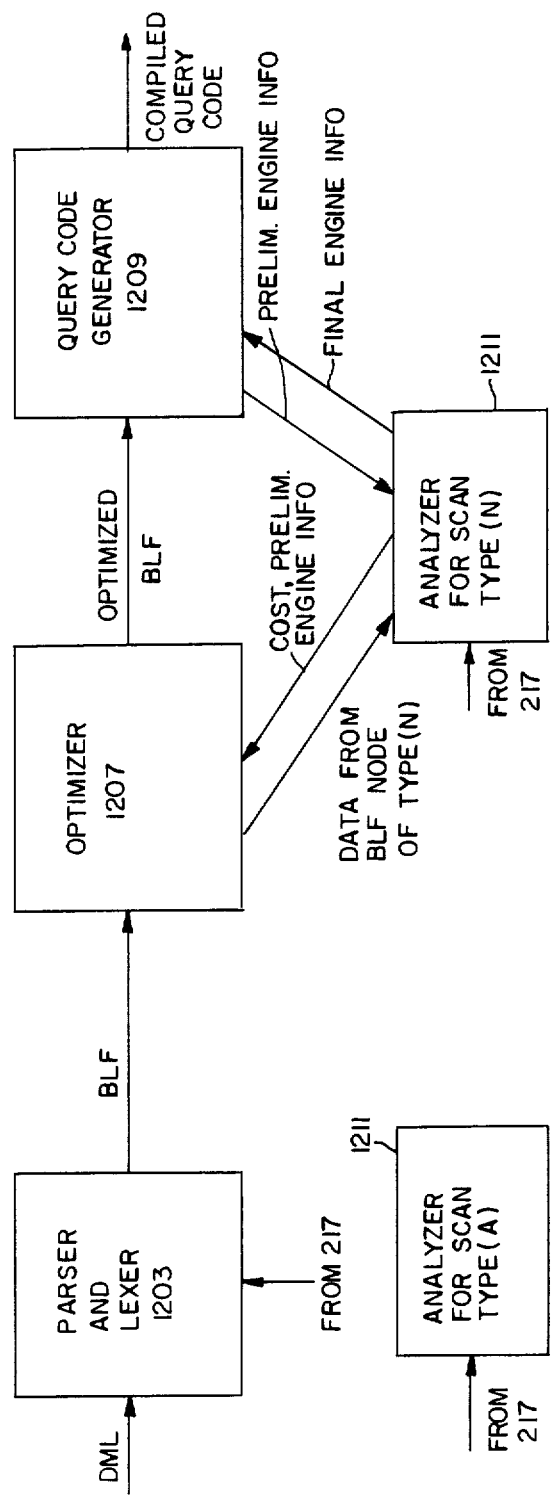
FIG. 12 is a conceptual drawing of the DML compiler in which the present invention is embodied.

5.2 DML Compiler 1201 of the Present Invention—FIG. 12

FIG. 12 is a schematic block diagram of DML compiler 1201 of the present invention. DML compiler 1201 performs the same functions in the data base system as DML compiler 211 of FIG. 2. The major components of DML compiler 1201 are parser and lexer 1203, which receives a query in DML and transforms it into an unoptimized BLF tree which is the logical equivalent of the query, optimizer 1207, which receives the unoptimized BLF tree and produces an optimized BLF tree, query code generator 1209, which generates compiled query code, and a plurality of scan analyzers 1211. Each scan analyzer 1211 corresponds to one type of node in an optimized BLF tree and to one set of scan engines 1107. A given scan analyzer 1211 receives data from optimized BLF nodes having the corresponding type from optimizer 1207. Scan analyzer 1211 uses the data it receives and information from data catalog 217 to determine what scan engines 1109 of the set of scan engines 1107 corresponding to the BLF node type may be used to produce the rows 107 specified by the node. For each of the scan engines 1107 which can produce the rows 107 represented by the node, scan analyzer 1211 returns data specifying the cost of using that scan engine 1211 and preliminary engine information which at a minimum specifies the scan engine 1211 and may also contain other data which may be later used to generate compiled query code for scan engine 1211.

Optimizer 1207 then uses the cost data returned for a node to select the most efficient scan engine 1109 and places the preliminary engine information for that scan engine into the node. Optimizer 1207 may further use the cost information to determine which of a set of alternate subtrees is the most efficient. An example of such an operation in a present embodiment is determining from the cost information that an index node 801 represents at most a single row 107 and then moving that index node 801 to the left of other nodes which are sources of a join node 707.

Optimizer 1207 thereupon provides the best optimized BLF tree to query code generator 1209, which passes the preliminary engine information in each node of the BLF tree to the scan analyzer 1211 corresponding to the given node. That scan analyzer 1211 then uses the preliminary engine information to produce final engine information, which it returns to optimizer 1207. Optimizer 1207 replaces the preliminary engine information with the final engine information, and query code generator 1209 then includes the final engine information in the compiled query code for the query. Optimizer 1207 and code generator 1209 treat the preliminary and final engine information provided by scan analyzer 1211 as a "black box", i.e., optimizer 1207 and code generator 1209 are not concerned with the contents of the preliminary and final information, but merely receive the preliminary engine information, store it in the node, provide it to the scan analyzer, receive the final engine information, and incorporate it unchanged into the compiled query code.

As mentioned above, each scan analyzer 1211 corresponds to one type of node which may appear in an optimized BLF tree. As will be explained in detail later, in a present embodiment, an optimized BLF tree may contain view nodes 701, restrict nodes 703, join nodes 707, relation nodes 709, DRID nodes, index nodes 801, and combiner nodes, and consequently, there are in a present embodiment seven scan analyzers 1211. In other embodiments there may be more or fewer types of nodes and correspondingly more or fewer types of scan analyzers 1211.

As may be determined from FIG. 1201 and the preceding discussion, an important feature of the present invention is that optimizer 1207 and query code generator 1209 are independent of the implementation of data catalog 217, of the kind of file system used in the data base system, and of the kind of digital data processing system in which the data base system is implemented. Since scan analyzer 1211 provides cost information, optimizer 1207 can determine which scan engine 1109 is most efficient or which subtree is more efficient without taking into account information in data catalog 217, the characteristics of the file system, or the characteristics of the digital data processing system. Further, since scan analyzer 1211 provides the preliminary and final engine information, query code generator 1209 can generate compiled query code without taking into account the characteristics of the file system or digital data processing system. Consequently, if the digital data processing system in which the data base system is implemented is changed, or if the data base system is implemented on a different digital data processing system, only scan analyzers 1211 need be modified.

Figure 13:
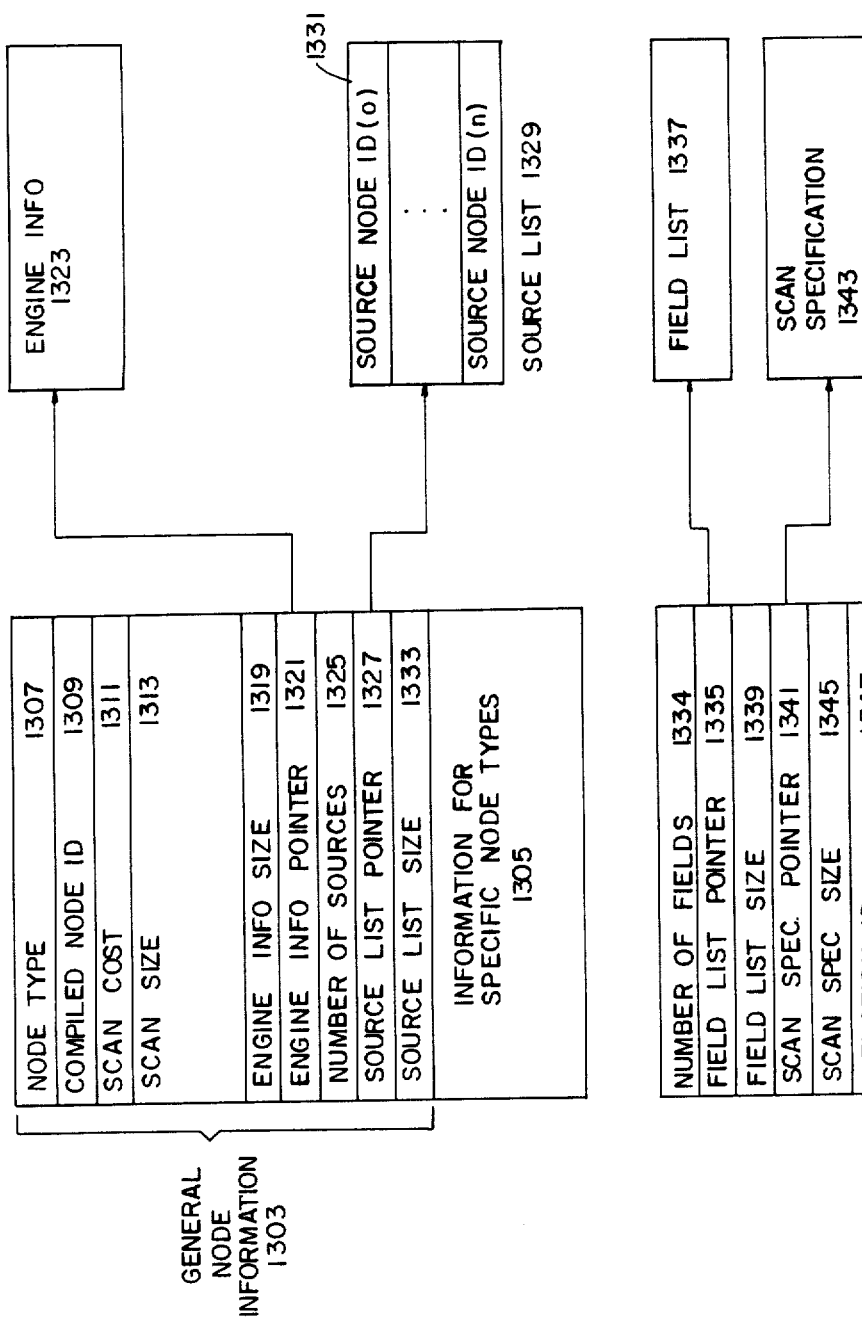
FIG. 13 is a drawing of a BLF node of the present invention.

5.3 BLF Nodes 1301 of the Present Invention—FIG. 13

As previously mentioned, in the present invention there are seven node types: the view node, the restrict node, the join node, the relation node, the index node, the RID node, and the combiner node. All of these but the combiner node have previously been explained. The combiner node represents operations which combine sets of rows 107 by appending the sets, returning the intersection of the sets, or the union of the sets.

FIG. 13 is a representation of the BLF nodes 1301 of the present invention. Each of nodes 1301 contains general node information 1303, which is the same for all BLF nodes 1301, and information for specific node types 1305, which varies for each node type. General node information 1303 contains the following fields:
* node type field 1307, which indicates which of the seven node types the node belongs to.
* compiled node id 1309, which is filled in if the node is part of the compiled query code.
* scan cost 1311, which specifies the cost of retrieving the rows 107 represented by the node.
* scan size 1313, which represents the number of rows 107 represented by the node.
* engine info size 1319 and engine info pointer 1321, which indicate the size and location respectively of engine info 1323, which contains first preliminary and then final engine info for the node.
* source list pointer 1327 and source list size 1323, which indicate the size and location respectively of source list 1329, containing a list of node identifiers for any source nodes for node 1301.

As an example of information for a specific node type 1305, FIG. 1351 includes information for index nodes 1351. The fields include:
* number of fields 1334, which indicates how many fields are in the row 107 represented by node 1301.
* field list pointer 1335 and field list size 1339, which respectively indicate the location and size of field list 1337, which specifies the columns to be returned in the rows 107 represented by index node 801.
* scan spec pointer 1341 and scan spec size 1345, which respectively indicate the location and size of scan specification 1343, which contains the specification for the rows 107 represented by index node 801.
* Relation ID 1347, which specifies the relation containing rows 107 represented by index node 1351.

Information in other types of nodes 1301 is generally similar to that shown for index node 1351, but varies as required for the functions of those nodes 1301. Further disclosure of the contents of those nodes 1301 is not required for understanding of the present invention.

Figure 14:
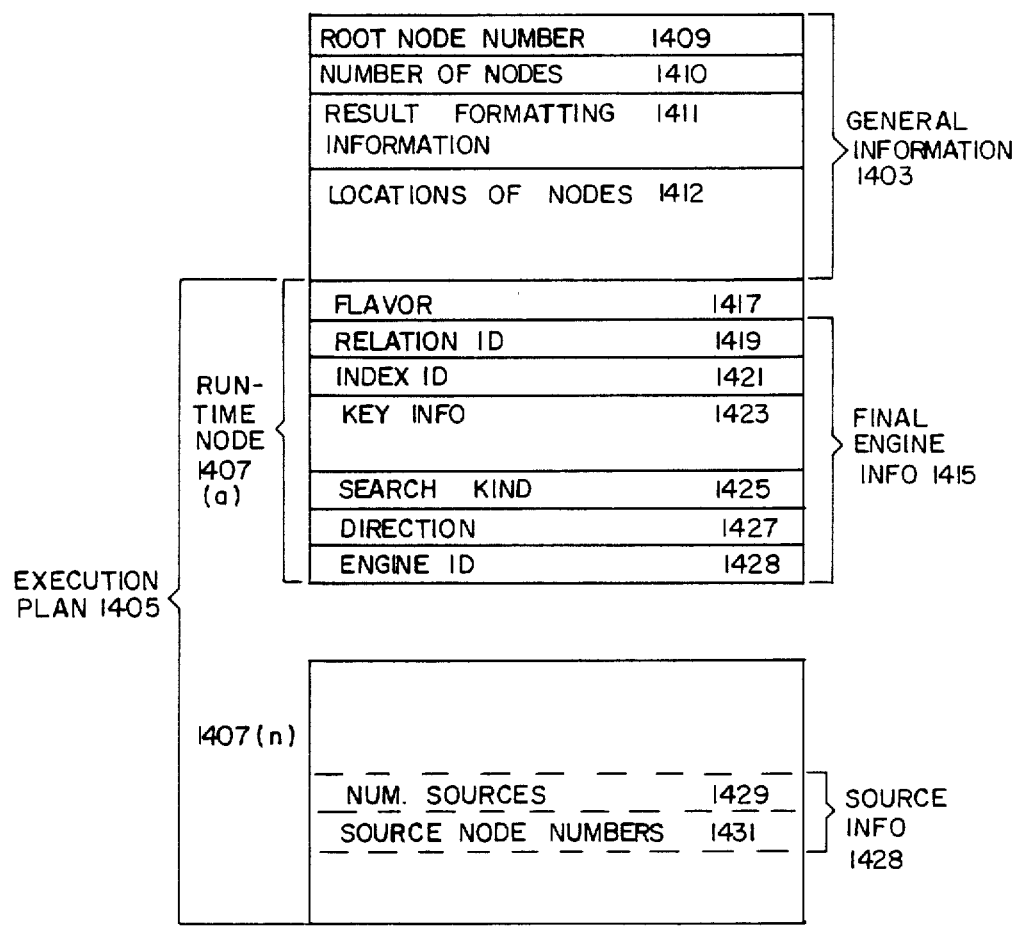
FIG. 14 is a drawing of a compiled tree of the present invention.

5.4 Compiled Query Code of the Present Invention—FIG. 14

FIG. 14 represents the compiled query code of the present invention. Query code generator 1209 translates a given optimized BLF tree into compiled tree 1401. The compiled tree has two main parts: general information 1403 and execution plan 1405. Execution plan 1405 contains a run-time node 1407 corresponding to each node 1301 of the optimized BLF tree from which compiled tree 1401 was produced.

General information 1403 contains root node number field 1409 specifying the number of run-time node 1407 corresponding to the root node 1301 of the optimized BLF tree, number of nodes field 1410, which indicates the number of run-time nodes 1407 in compiled tree 1401, result formatting information field 1411, which specifies how the fields resulting from the query represented by compiled tree 1401 are to be formatted (e.g., whether they are to be sorted or whether duplicate fields are to be suppressed) and location of nodes field 1412, which relates the number of each run-time node 1407 in execution plan 1405 to the location of the beginning of the node 1407.

Execution plan 1405 contains a run-time node 1407 corresponding to each node 1301 of the optimized BLF tree. The contents of a given run-time node 1407 depend on the kind of BLF node 1301 to which it corresponds. All run-time nodes 1407 contain flavor field 1417 and final engine info 1415. Flavor field 1417 is derived from node type field 1307 of BLF node 1301 corresponding to run-time node 1407. In run-time node 1407, it specifies the set of scan engines 1107 to which scan engine 1109 which is to execute run-time node 1407 belongs. The contents of final engine info 1415 depend on the kind of scan engine 1109 selected by optimizer 1207.

FIG. 14 provides by way of example run-time node 1407(a) corresponding to an index node 801. In node 1407(a), final engine info 1415 contains the following:
* identifiers for the relation containing rows 107 and the index employed for the restriction.
* key info 1423 describes the key employed for the restriction, including whether the key is a primary key.
* search kind 1425 specifies the kind of search (e.g., for rows 107 whose keys are equal to a constant, not equal to a constant, less than a constant, greater than a constant, inside a range of values, outside a range of values).
* direction field 1427 specifies the direction of the search, i.e., by increasing or decreasing key value.
* engine ID field 1428, which specifies the scan engine 1109 which is to execute run-time node 1406.

Run-time nodes 1407 corresponding to BLF nodes 1301 which have sources also contain source info 1428, shown in run-time node 1407(n). Source info 1428 contains two fields, number of sources 1429, specifying the number of sources for run-time node 1407, and source node numbers 1431, which specifies the numbers of the run-time nodes 1407 which are the source nodes.

While the compiled query code for a query in the present embodiment corresponds in form to the optimized BLF tree for the query, the compiled query code in other embodiments might take other forms but likewise incorporate final engine info 1415 provided by scan analyzer 1211.

5.5 Cooperation of Optimizer 1207, Query Code Generator 1209, and Scan Analyzer 1211

Figure 15:
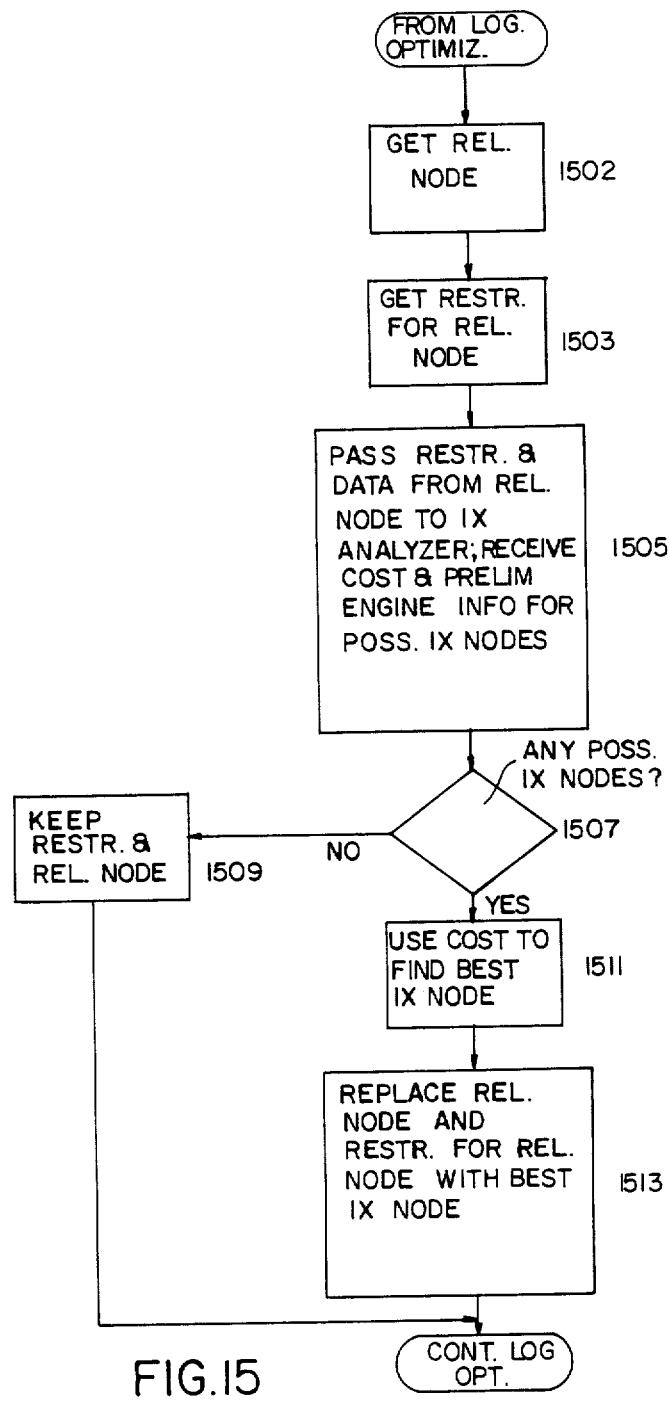
FIG. 15 is a flowchart of the operation of the query optimizer of the present invention.

The cooperation of optimizer 1207, query code generator 1209, and scan analyzer 1211 in a present embodiment may be illustrated for the case of relation nodes 709 and index nodes 801. As illustrated in FIG. 8, one optimization performed by optimizer 1207 is the replacement of a restrict node 703 where the restriction involves an index value and a relation node 709 with an index node 801. The manner in which the present invention performs the optimization is shown in flowchart 1501 of FIG. 15. First, optimizer 1207 gets relation node 709 and the restriction for the node 709 from restrict node 703 (1502,1503). Then it provides the portion of the restriction containing only constants and data from relation node 709 to scan analyzer 1211 for index scans (1505), which determines whether there are any index nodes 801 which are equivalent to relation node 709 as restricted by the restriction and returns the scan size, scan cost, and preliminary engine info for each possible index node 801. Scan cost 1311 includes upper and lower bounds for I/O and CPU cost and scan size 1313 specifies the upper and lower bounds for the number of rows 107 represented by that index node 801.

If scan analyzer 1211 can find no index node 801 equivalent to the restricted relation node 709, optimizer 1207 keeps the relation node. Otherwise, it uses the information in scan cost 1311 and scan size 1313 to determine which of the possible index nodes 801 is most efficient. It then replaces the original relation node 709 and restriction node 703 with an index node 801 containing the preliminary engine info, scan size, and scan cost information returned for the most efficient node. If scan size 1313 indicates that index scan node 801 represents at most 1 row 107 (i.e., that the index uses a primary key value), optimizer 1207 may move index node 801 to the left as previously described.

5.6 Generation and Execution of Compiled Query Code

As described above, when optimizer 207 is finished, it provides the optimized BLF tree to query code generator 1209. As query code generator 1209 creates run-time node 1407 corresponding to the index node 801 in the optimized BLF tree, it provides preliminary engine info from engine info 1323 in that node to scan analyzer 1211 for index nodes. Scan analyzer 1211 uses the information in the preliminary engine info to produce the final engine info and returns the final engine info to query code generator 1209, which places it unchanged in run-time node 1407 corresponding to the index node 801.

Query code interpreter 1101 in a present embodiment executes compiled tree 1401 recursively: unpacker 1103 first unpacks general information 1403. It then uses root node number 1409 and locations of nodes 1412 to unpack run-time node 1407 corresponding to the root node 1301 of the BLF tree. Next, it calls scan engine 1109 specified by engine ID field 1428 of that node 1407 and provides scan engine 1109 with final engine info 1415. If the root node 1407 has source nodes 1407 scan engine 1109 recursively invokes unpacker 1103 for each source node 1407 using the source node numbers contained in source info 1428 and proceeding from left to right. For each source node 1407 unpacker 1103 unpacks the run-time node and calls scan engine 1109, as just described. The recursion continues until a run-time node 1407 corresponding to a leaf node 1301 of the BLF tree is reached. At that point, scan engine 1109 for the corresponding run-time node 1407 fetches the rows 107 represented by run-time node 1407 and returns them as results to run-time node 1407 corresponding to the BLF node 1301 for which the leaf node is a source. Scan engine 1109 specified in that node 1407 then performs its operation on all of the rows 107 provided by the source node and returns the result of the operation to any node 1407 for which it is a source. Thus, on return from the scan engine for the root node 1407, all of the operations required to retrieve rows 107 specified in the query have been performed. Query code interpreter 1101 then formats the returned rows 107 as specified in result formatting information 1411 and returns the formatted results to the program invoking the query code interpreter.

In other embodiments, execution of compiled query code may not be recursive and query code generator 1209 may generate compiled query code which is ordered in such fashion that execution begins with the leaf nodes. Further, in other embodiments, final engine info 1415 may contain instructions directly executable by the digital data processing system in which the data base system is implemented. In such embodiments, these instructions would be provided directly to processor 201.

The invention may be embodied in yet other specific forms without departing from the spirit or essential characteristics thereof. Thus, the present embodiments are to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. In a digital computer system employing a data base system for accessing stored data, means for transforming logical query data representing a query to be performed by said data base system into query code executable by said data base system comprising:
   (1) implementation-dependent analysis means for receiving certain said logical query data representing a said query and responding thereto by providing a cost data specifying the cost of an operation in said data base system specified by certain said logical query data and implementation-dependent portions of said query code required to perform said specified operation; and
   (2) implementation-independent transformation means for modifying said logical query data in response to said cost data and producing said executable query code containing said implementation-dependent portions from said analysis means.

2. In the logical query data transformation means of claim 1, and wherein:
   said data base system includes a plurality of means for accessing said stored data;
   said implementation-dependent analysis means comprises a plurality of scan analyzing means, each one of said scan analyzing means corresponding to certain of said plurality of means for accessing said stored data;
   each one of said scan analyzing means provides said cost data for said means for accessing said stored data corresponding thereto; and
   each one of said scan analyzing means provides said implementation-dependent portions of said query code specifying said means for accessing said stored data corresponding thereto.

3. In the logical query data transformation means of claim 2, and wherein:
   each one of said scan analyzing means further provides preliminary information specifying a certain said means for accessing said stored data to said implementation-independent transformation means together with said cost data;
   said implementation-independent transformation means incorporates said preliminary information into said modified logical query data and returns said incorporated preliminary information to said scan analyzing means which provided said preliminary information; and
   each said scan analyzing means receiving said preliminary information produces said implementation-dependent portions of said executable query code therefrom.

4. In a digital computer system employing a data base system for accessing stored data by means of a plurality of access methods, improved query code generation means for generating query code executable by said data base system from logical query data representing a query wherein the improvement comprises:
   (1) preliminary information in said logical query data specifying certain of said plurality of access methods as are required for said query; and
   (2) a scan analyzer for receiving said preliminary information and providing therefor said executable query code for said access methods as are required for said query.

5. In the improved query code generation means of claim 4, and wherein:
   said improved query code generation means further comprises a plurality of said scan analyzers, each one of said scan analyzers corresponding to a certain one of said plurality of access methods and receiving said preliminary information for said corresponding access method and providing said executable code for said certain one of said access methods.

6. In the improved query code generation means of claim 5, and wherein:
   said data base system further includes pluralities of access execution means, each one of said pluralities corresponding to one of said plurality of access methods;
   said preliminary informations specifies one of said plurality of access execution means corresponding to a given one of said plurality of access methods; and
   said scan analyzer corresponding to said given one of said plurality of access methods provides said executable code specifying said one access execution means.

7. In a digital computer system employing a data base system for accessing stored data by means of a plurality of access methods, improved means for optimizing logical query data corresponding to queries comprising:
   (1) a scan analyzer for determining the cost of any certain of said plurality of access methods and returning cost data specifying said cost; and (2) means responsive to said cost data for altering said logical query data for a given said query to employ said access methods having the lowest said cost for the given said query.

8. In the improved means for optimizing logical query data of claim 7, and wherein:
said improved means for optimizing logical query data further comprises a plurality of said scan analyzers, each one of said scan analyzers corresponding to one of said plurality of access methods and returning said cost data for said corresponding access method.

9. In the improved means for optimizing logical query data of claim 8, and wherein:
said data base system further includes pluralities of access execution means, each one of said pluralities corresponding to one of said plurality of access methods; and
said scan analyzer corresponding to one certain of said plurality of access methods determines said cost data for said plurality of access execution means corresponding to said one certain of said plurality of access methods.

10. In a data base system implemented in a digital computer system, the method of transforming logical query data representing a query to be performed by said data base system into logical query data representing a more efficient form of said query comprising the steps of:
(1) providing said logical query data to a scan analyzer for determining the cost of employing certain ones of a plurality of access methods;
(2) comparing the relative cost of said certain access methods; and
(3) selecting the most cost-efficient one of said certain access methods and altering said logical query data to employ said selectled one.

11. In a data base system implemented in a digital computer system, the method of transforming logical query data into query code executable by said data base system comprising the steps of:
(1) providing preliminary information concerning one of a plurality of access methods from said logical query data to a scan analyzer corresponding to said access method;
(2) receiving portions of said executable query code specific to said access method specified in said preliminary information from said scan analyzer; and
(3) generating, from said logical query data, said executable query code incorporating said portions of said executable query code specific to said access method.

* * * * *